(12) United States Patent
Wettstein et al.

(10) Patent No.: US 11,351,722 B2
(45) Date of Patent: Jun. 7, 2022

(54) STEREOLITHOGRAPHY DEVICE AND METHOD FOR ADJUSTING A STEREOLITHOGRAPHY DEVICE

(71) Applicant: Ivoclar Vivadent AG, Schaan (LI)

(72) Inventors: Markus Wettstein, Schlieren (CH); Stefan Geissbuehler, Schlieren (CH)

(73) Assignee: Ivoclar Vivadent AG, Schaan (LI)

( * ) Notice: Subject to any disclaimer, the term of this patent is extended or adjusted under 35 U.S.C. 154(b) by 144 days.

(21) Appl. No.: 16/801,578

(22) Filed: Feb. 26, 2020

(65) Prior Publication Data

US 2020/0269492 A1    Aug. 27, 2020

(30) Foreign Application Priority Data

Feb. 27, 2019 (EP) .................... 19159596

(51) Int. Cl.
*B29C 64/129* (2017.01)
*B33Y 30/00* (2015.01)
*B33Y 50/02* (2015.01)
*B29C 64/264* (2017.01)
*B29C 64/393* (2017.01)
*H05B 47/105* (2020.01)
*G02B 26/08* (2006.01)
*B29C 64/277* (2017.01)
*B29C 64/282* (2017.01)

(52) U.S. Cl.
CPC .......... *B29C 64/129* (2017.08); *B29C 64/264* (2017.08); *B29C 64/393* (2017.08); *B33Y 30/00* (2014.12); *B33Y 50/02* (2014.12); *G02B 26/0833* (2013.01); *H05B 47/105* (2020.01); *B29C 64/277* (2017.08); *B29C 64/282* (2017.08)

(58) Field of Classification Search
CPC ... B29C 64/129; B29C 64/264; B29C 64/393; B29C 64/277; B29C 64/282; B33Y 30/00; B33Y 50/02; H05B 47/14; H05B 47/00; H05B 47/105; G02B 26/0833
USPC ...................................... 264/40.1
See application file for complete search history.

(56) References Cited

U.S. PATENT DOCUMENTS

| | | | |
|---|---|---|---|
| 7,643,746 B2 | 1/2010 | Yoneda et al. |
| 9,233,507 B2 | 1/2016 | Bibas |
| 9,386,669 B2 | 7/2016 | Karc et al. |
| 9,459,580 B2 | 10/2016 | Burnett |
| 10,207,489 B2 | 2/2019 | Dave et al. |
| 10,532,577 B1 | 1/2020 | Porter |
| 10,539,952 B2 | 1/2020 | Mehr et al. |
| 2008/0054531 A1 | 3/2008 | Kerekes et al. |
| 2016/0332368 A1 | 11/2016 | Kerekes et al. |

(Continued)

FOREIGN PATENT DOCUMENTS

WO    2013170311 A1    11/2013
WO    WO-2013170311 A1 *  11/2013    ........... B29C 64/129

*Primary Examiner* — Joseph S Del Sole
*Assistant Examiner* — Lawrence D. Hohenbrink, Jr.
(74) *Attorney, Agent, or Firm* — Ann M. Knab; Thad McMurray

(57) ABSTRACT

The present invention relates to a stereolithography device (100) comprising a light source (101) for emitting light to cure a light-curing material (121); a sensor (103) for determining an actual value of the light intensity of the emitted light; and a control unit (105) for adapting the electric current through the light source (101) until the actual value of the light intensity reaches a specified desired value.

14 Claims, 2 Drawing Sheets

(56) References Cited

U.S. PATENT DOCUMENTS

| | | |
|---|---|---|
| 2018/0186066 A1 | 7/2018 | Cooper |
| 2019/0111624 A1 | 4/2019 | Lee et al. |

* cited by examiner

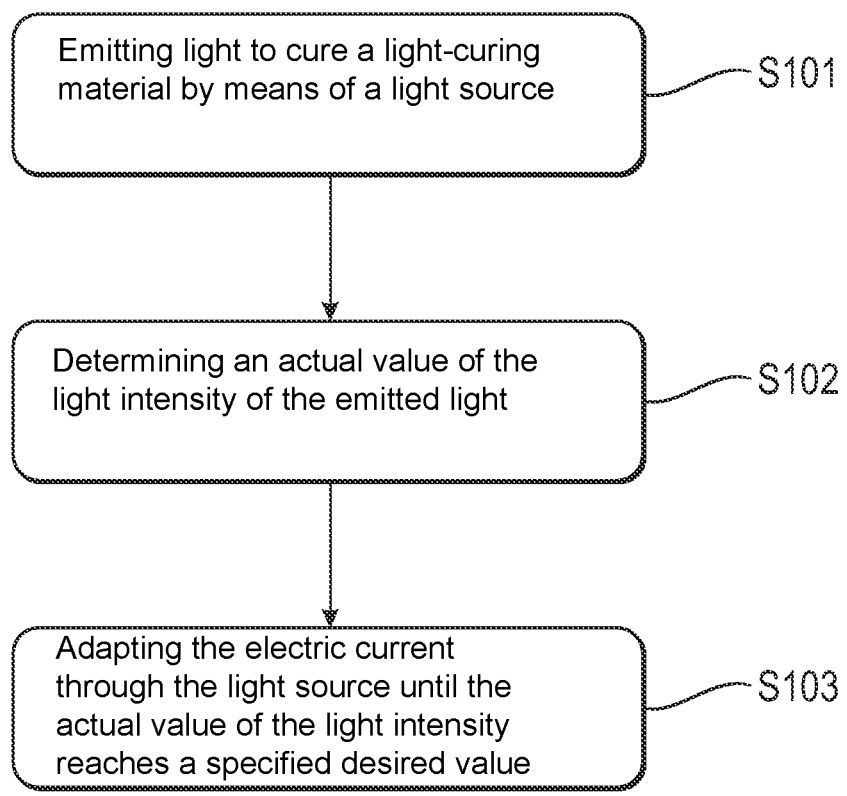

STEREOLITHOGRAPHY DEVICE AND METHOD FOR ADJUSTING A STEREOLITHOGRAPHY DEVICE

CROSS-REFERENCE TO RELATED APPLICATIONS

This application claims priority to European patent application No. 19159596.6 filed on Feb. 27, 2019, the disclosure of which is incorporated herein by reference in its entirety.

FIELD OF INVENTION

The present invention relates to a stereolithography device and to a method for adjusting a stereolithography device.

BACKGROUND

Stereolithography (SLA) is a three-dimensional printing method, in which a workpiece is built up in steps from a liquid bath of a photopolymer or the workpiece is produced in a liquid bath by means of a build platform. The build platform is initially introduced into the liquid bath and is removed from the liquid bath after the formation of individual layers. Subsequently, the build platform is re-introduced into the liquid bath until the desired object is produced. A light pattern is projected onto the photopolymer in each step. The photopolymer is cured at the locations where the light pattern impinges upon the photopolymer. In this way, the workpiece can be produced layer-by-layer having the desired shape.

An ultraviolet light source (e.g. LED) of the stereolithography device is affected by ageing effects over the required service life and so the light intensity decreases with electric current remaining constant. Other components in the light path, such as prisms, lenses, light mixing rods and electronic mirror devices, also exhibit degrading effects by reason of the high level of UV light irradiation, said effects manifesting in reduced irradiation intensity on the production panel. However, to ensure the quality of the building process it is of crucial importance that the light intensity remains constant over the entire service life of the stereolithography device.

Document EP 18 190 700.7 and corresponding commonly owned U.S. application Ser. No. 16/539,275, filed Aug. 13, 2019, which is hereby incorporated by reference in its entirety, relates to a method for constructing a moulded body in layers by stereolithographically curing a photopolymerisable material in consecutive layers by exposing said material to an illumination unit.

Additional examples of additive manufacturing or printing systems and methods or art related hereto are set forth in U.S. Pat. Nos. 10,539,952, 10,532,577, 10,207,489, 9,233,507, 9,459,580, 20160332368, 20080054531, 20190111624, and 20180186066 which are hereby incorporated by reference in their entirety.

U.S. Pat. Nos. 7,643,746, and 9,386,669 are directed to light intensity adjusting or controlling systems and are hereby incorporated by reference.

To date, the problem has either been ignored or solved by ageing compensation, in which the exposure time and/or the current strength of the light source is adapted with a fixedly stored characteristic over the duration. However, the stored characteristic does not take the sample variation of the components used into account. Therefore, the control of the light intensity via the ageing characteristic of the light source and the unpredictable ageing behaviour of the remaining light path is imprecise.

SUMMARY

Therefore, it is the technical object of the present invention to maintain a light intensity in a stereolithography device with a high level of precision over the service life.

This object is achieved by the subject matter of the independent claims. Advantageous embodiments are the subject of the dependent claims, the description and the figures.

According to a first aspect, this object is achieved by means of a stereolithography device comprising a light source for emitting light to cure a light-curing material; a sensor for determining an actual value of the light intensity of the emitted light; and a control unit for adapting the electric current through the light source until the actual value of the light intensity reaches a specified desired value. Since the sensor does not exhibit any ageing phenomena, the light intensity can be controlled by means of a closed loop to exactly the specified desired value of the light intensity. As a result, ageing phenomena by means of outgassing during irradiation or heating of synthetic material parts, general environmental influences or deposits during the production process of the remaining components can also be compensated for within the light path, such as prisms, lenses, light mixing rods and the digital mirror device (DMD). A time-constant light intensity and an extended service life of the stereolithography device are achieved.

In a technically advantageous embodiment of the stereolithography device, the stereolithography device is designed to deflect the light from a light source to the sensor via a digital mirror device which serves to project a light pattern onto the light-curing material. This provides e.g. the technical advantage that, where required, the light can be directed onto a coupling-out light path and the service life of the sensor is extended.

In a further technically advantageous embodiment of the stereolithography device, the digital mirror device is arranged adjacent to a prism surface. This provides e.g. the technical advantage that the structural shape of the stereolithography device can be made smaller.

In a further technically advantageous embodiment of the stereolithography device, the stereolithography device is designed to project a specified light pattern onto the sensor by means of the digital mirror device. This provides e.g. the technical advantage that the light quantity onto the sensor can be metered precisely.

In a further technically advantageous embodiment of the stereolithography device, the stereolithography device comprises a mirror surface for deflecting the light onto the sensor. This provides e.g. the technical advantage that the sensor can be arranged in a flexible manner at different positions in the interior of the stereolithography device.

In a further technically advantageous embodiment of the stereolithography device, the mirror surface is arranged adjacent to a prism diaphragm. This provides e.g. the technical advantage that the prism diaphragm defines a specified outlet opening and undesired scattering light is reduced.

In a further technically advantageous embodiment of the stereolithography device, the sensor is designed specifically for detecting ultraviolet light. This provides e.g. the technical advantage that a long service life of the sensor is achieved.

In a further technically advantageous embodiment of the stereolithography device, the sensor is formed by means of a photodiode. This provides e.g. the technical advantage that the sensor is cost-effective and at the same time exhibits minor ageing phenomena.

In a further technically advantageous embodiment of the stereolithography device, the control unit comprises a controller for controlling the current through the light source, such as e.g. a PID controller or PI controller. This provides e.g. the technical advantage that the closed loop is controlled rapidly and efficiently.

According to a second aspect, this object is achieved by a method for adjusting a stereolithography device, comprising the steps of emitting light to cure a light-curing material by means of a light source; determining an actual value of the light intensity of the emitted light; and adapting the electric current through the light source until the actual value of the light intensity reaches a specified desired value. The method provides the same technical advantages as the stereolithography device according to the first aspect.

In a technically advantageous embodiment of the method, the light is deflected from the light source to the sensor by means of a digital mirror device which serves to project a light pattern onto the light-curing material. This likewise provides e.g. the technical advantage that, where required, the light can be directed onto a coupling-out light path and the service life of the sensor is extended.

In a further technically advantageous embodiment of the method, a specified light pattern is projected onto the sensor by means of the digital mirror device. This likewise provides e.g. the technical advantage that the light incident on the sensor can be metered precisely.

In a further technically advantageous embodiment of the method, the light is deflected onto the sensor via a mirror surface. This likewise provides e.g. the technical advantage that the sensor can be arranged in a flexible manner at different positions in the interior of the stereolithography device.

In a further technically advantageous embodiment of the method, the current is controlled to the desired value by means of a controller, such as e.g. a PID controller. This likewise provides e.g. the technical advantage that the closed loop is controlled rapidly and efficiently.

In a further technically advantageous embodiment of the method, the light is guided by means of a prism diaphragm. This likewise provides e.g. the technical advantage that the prism diaphragm defines a specified outlet opening and the determining of the actual value is performed in a comparable manner during different measurements.

BRIEF DESCRIPTION

Exemplified embodiments of the invention are illustrated in the drawings and are described in more detail hereinunder.

In the figures:

FIG. 2 shows a block diagram of a method for adjusting a stereolithography device.

DETAILED DESCRIPTION

Figure 1:
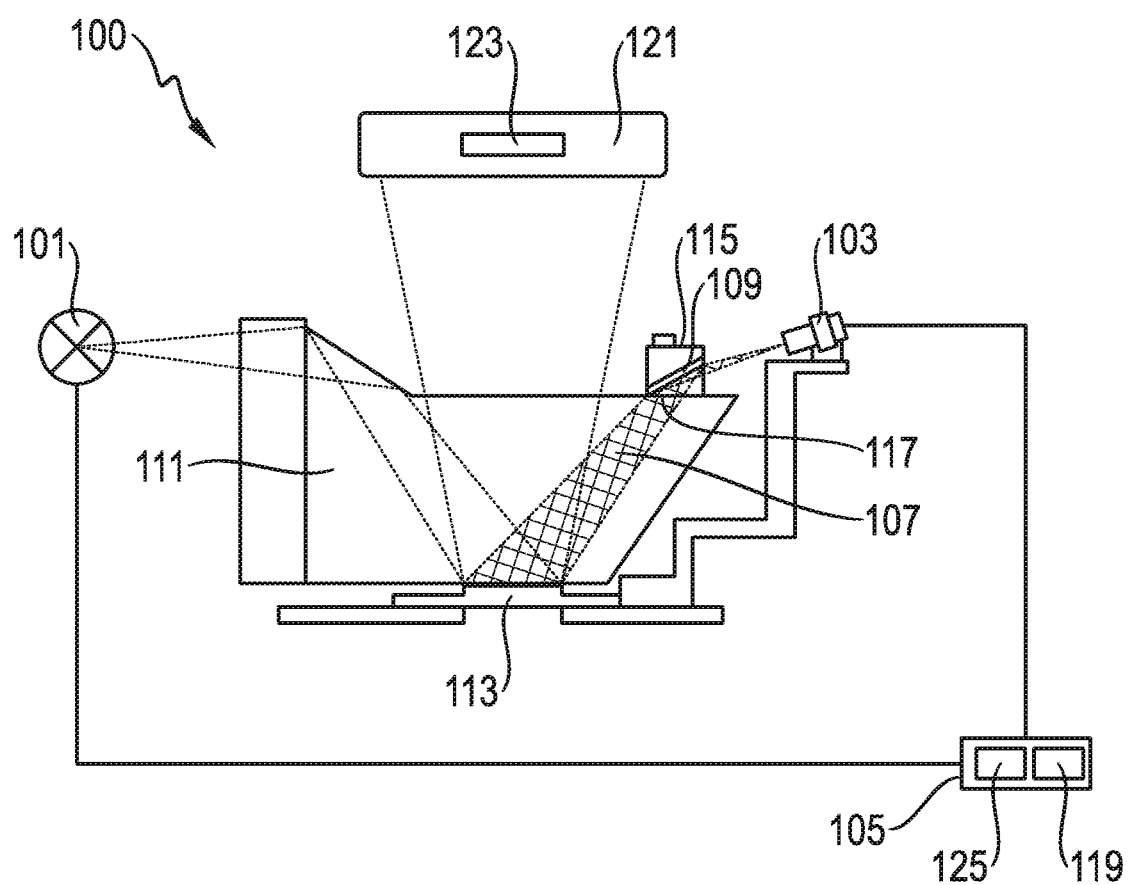
FIG. 1 shows a schematic view of stereolithography device.

FIG. 1 shows a schematic view of a stereolithography device 100. The stereolithography device 100 is used for producing workpieces by means of a three-dimensional printing method (3D printing). For this purpose, the workpiece is located in a liquid bath of a light-curing material, such as e.g. a photopolymer which is built up in steps. In each step, a specific light pattern 123 is projected onto the light-curing material 121. The photopolymer is cured and becomes solid at the locations where the light pattern 123 impinges upon the light-curing material. In this way, the workpiece can be produced layer-by-layer having the desired shape.

The stereolithography device 100 comprises a light source 101, such as, but not limited to, e.g. a bulb, an ultraviolet LED (UV-LED), and a luminescent source, which is used for generating the light which cures the material. Furthermore, the stereolithography device 100 comprises a closed loop, by means of which the light intensity is measured, and the light intensity is compensated for on the basis of the measurement data obtained. In this manner, a closed loop can be produced which permits a precise adjustment of the light intensity over the entire service life of the stereolithography device 100 on the basis of a pre-adjusted desired value and by means of which ageing effects of the optical components can be compensated for. In addition, by means of a temperature detector the resistance of the light-emitting diode can be measured and the supply of current can be adapted accordingly and so the service life of the light-emitting diode is additionally extended. If e.g. the measured temperature increases, the resistance of the light-emitting diode decreases. In this case, an excessively high current can flow through the light-emitting diode.

For this purpose, the light emitted by the light source 101 is directed onto a coupling-out light path 107 e.g. by means of a digital mirror device (digital micromirror device—DMD) 113. The digital micromirror device 113 comprises a multiplicity of micromirror actuators which are arranged in the form of a matrix, can be individually actuated by means of electric voltages and can be tilted. Therefore, each individual one of these micromirror actuators can direct the impinging light in the direction of the light-curing material 121 or in the direction of the coupling-out light path 107 onto the sensor 103. In this manner, the light patterns 123 which solidify the light-curing material 121 can be generated.

As a result, all of the light or merely specific light patterns can be directed onto the sensor 103. The light can be coupled out merely for a specific, predefined time period during a calibration procedure and so the sensor 103 is subjected to the illumination only in this time period. The calibration procedure can be performed e.g. after each layer (slice) during a building process, after a specified number of layers (iterations), after each component or after each maintenance procedure or service.

The coupled-out light is directed onto the sensor 103 via a reflective mirror surface 109 at the holding-down device 115 of the prism diaphragm 117. The prism diaphragm 117 defines an outlet opening, having a specified surface area, on the surface of the prism 111 and so the coupling-out light path 107 is laterally delimited and the undesired scattered light is thus reduced. By means of the mirror surface 109, the light is deflected onto the sensor 103 and so the sensor can be arranged directly above the prism 111. As a result, the sensor 103 can also be arranged at locations inside the stereolithography device 100 which do not lie in the original propagation direction of the coupling-out light path 107.

The sensor 103 is designed in such a manner that it is suitable specifically for the light used in the stereolithography method and no measurement deterioration occurs throughout the service life. For this purpose, the sensor 103 is formed e.g. from a photodiode. However, other sensors 103 such as, but not limited to, photo detectors, a variable resistive element, a photoresistor, a photo transistor, and a Charged Coupled Device (CCD) can also be used, in general.

The measurement uncertainty is compensated for by virtue of the fact that during the measuring procedure the measured actual value of the light intensity is fed e.g. into a PID controller (proportional-integral-derivative controller) 119 which is arranged in a control unit 105. The PID controller is a combination of a proportional controller (P controller), an integral controller (I controller) and a differential controller (D controller).

The proportional controller multiplies the control deviation by its amplification factor. The integral controller sums the control deviation over time and multiplies the sum (i.e. the integral) by a factor. The differential controller evaluates (differentiates) the change in a control deviation and thus calculates its rate of change. The PID-controlled circuit permits precise and rapid current adjustment to the specified desired value. In general, other controllers can also be used for controlling the light intensity.

The desired value can be stored as a digital value in the production of the stereolithography device 100 in a device-specific manner in a non-volatile data memory 125, such as e.g. a flash memory. The actual value of the light intensity can likewise be recorded digitally and compared to the stored desired value. Depending upon the deviation between the actual value and the desired value, the electric current through the light source 101 can be increased or decreased for as long as until the actual value of the light intensity corresponds to the stored desired value. The current value can be adapted e.g. via pulse width modulation or amplitude modulation.

Therefore, the electronic PID controller or PI controller 119 is used for controlling the light intensity to the required desired value by means of a current control for the light source 101. In this way, ageing compensation and a calibration procedure can be performed rapidly and efficiently via the PID controller 119. However, in general other control mechanisms with a closed loop are possible in order to control the light intensity of the stereolithography device 100 to a specified desired value.

During the measurement, the PID controller 119 controls the light intensity of the light source 101 until it reaches the specified desired value. This desired value serves as a reference value and is determined e.g. during the initial calibration of the stereolithography device 100 during production. The current value necessary for reaching the desired value is returned by the control unit 105 to the stereolithography device 100 and is used as a new reference value for the current.

FIG. 2 shows a block diagram of a method for adjusting the stereolithography device 100. In step S101, light for curing the light-curing material 121 is emitted by means of the light source 101. Subsequently, in step S102 the actual value of the light intensity of the emitted light is determined by the sensor 103. In step S103, the electric current through the light source 101 is increased or decreased for as long as until the actual value of the light intensity reaches the specified desired value. The method renders it possible to adjust the light intensity for curing the light-curing material 121 to the desired magnitude in an exact manner and in a constant manner with respect to time. Since the sensor 103 is subjected only to low age-induced deterioration, the light intensity can be controlled with a high level of precision to a specified value.

All features explained and illustrated in conjunction with individual embodiments of the invention can be provided in different combinations in the subject matter in accordance with the invention in order to achieve the advantageous effects thereof at the same time.

All the method steps can be implemented by devices which are suitable for carrying out the respective method step. All functions which are carried out by features relating to the device can be a method step of a method.

The scope of protection of the present invention is set by the claims and is not limited by the features explained in the description or shown in the figures.

In some embodiments, the processors may comprise a hardware processor such as a central processing unit (CPU), a graphic processing unit (GPU), a general-purpose processing unit, or computing platform. The one or more processors may be comprised of any of a variety of suitable integrated circuits, microprocessors, logic devices and the like. Although the disclosure is described with reference to a processor, other types of integrated circuits and logic devices may also be applicable.

In some embodiments, a computer system may include memory or memory locations (e.g., random-access memory, read-only memory, flash memory), electronic storage units (e.g., hard disks), communication interfaces (e.g., network adapters) for communicating with one or more other systems, and peripheral devices, such as cache, other memory, data storage and/or electronic display adapters. The memory, storage units, interfaces and peripheral devices may be in communication with the one or more processors, e.g., a CPU, through a communication bus, e.g., as is found on a motherboard. The storage unit(s) may be data storage unit(s) (or data repositories) for storing data.

The one or more processors, e.g., a CPU, execute a sequence of machine-readable instructions, which are embodied in a program (or software). The instructions are stored in a memory location.

The instructions are directed to the CPU, which subsequently program or otherwise configure the CPU to implement the methods of the present disclosure. Examples of operations performed by the CPU include fetch, decode, execute, and write back. The CPU may be part of a circuit, such as an integrated circuit. One or more other components of the system may be included in the circuit. In some cases, the circuit is an application specific integrated circuit (ASIC).

In some embodiments, the computer system typically includes, or may be in communication with, an electronic display for providing, for example, images captured by a machine vision system. The display is typically also capable of providing a user interface (UI). Examples of UI's include, but are not limited to, graphical user interfaces (GUIs), web-based user interfaces, and the like.

LIST OF REFERENCE SIGNS

100 stereolithography device
101 light source
103 sensor
105 control unit
107 coupling-out light path
109 mirror surface
111 prism
113 digital mirror device/digital micromirror device
115 holding-down device
117 prism diaphragm
119 PID controller
121 light-curing material
123 light pattern
125 data memory

The invention claimed is:

1. Method for adjusting a stereolithography device (100), comprising the steps of:
    emitting (S101) light to cure a light-curing material (121) by a light source (101);
    determining (S102) an actual value of the light intensity of the emitted light; and
    adapting (S103) the electric current through the light source (101) until the actual value of the light intensity reaches a specified desired value;
    wherein the light is deflected from the light source (101) to a sensor (103) by a digital mirror device (113) which is used for projecting a light pattern (123) onto the light-curing material (121).

2. Method as claimed in claim 1,
    wherein the light is deflected onto the sensor (103) via a mirror surface (109).

3. Method as claimed in 1,
    wherein the current is controlled to the desired value by a controller (119).

4. Method for adjusting a stereolithography device (100) comprising the steps of:
    emitting (S101) light to cure a light-curing material (121) by a light source (101);
    determining (S102) an actual value of the light intensity of the emitted light; and
    adapting (S103) the electric current through the light source (101) until the actual value of the light intensity reaches a specified desired value;
    wherein a specified light pattern is projected onto the sensor (103) by a digital mirror device (113).

5. Method for adjusting a stereolithography device (100) comprising the steps of:
    emitting (S101) light to cure a light-curing material (121) by a light source (101);
    determining (S102) an actual value of the light intensity of the emitted light; and
    adapting (S103) the electric current through the light source (101) until the actual value of the light intensity reaches a specified desired value;
    wherein the light is guided through a prism diaphragm (117).

6. Stereolithography device (100), comprising:
    a light source (101) for emitting light to cure a light-curing material (121);
    a sensor (103) for determining an actual value of the light intensity of the emitted light; and
    a control unit (105) for adapting the electric current through the light source (101) until the actual value of the light intensity reaches a specified desired value;
    wherein the stereolithography device (100) is configured to deflect the light from the light source (101) to the sensor (103) via a digital mirror device (113) which is used for projecting a light pattern (123) onto the light-curing material (121).

7. Stereolithography device (100) as claimed in claim 1,
    wherein the digital mirror device (113) is arranged adjacent to a prism surface.

8. Stereolithography device (100) as claimed in claim 1,
    wherein the stereolithography device (100) is designed to project a specified light pattern onto the sensor (103) by means of the digital mirror device (113).

9. Stereolithography device (100) as claimed in claim 1, wherein the stereolithography device (100) comprises a mirror surface (109) for deflecting the light onto the sensor (103).

10. Stereolithography device (100) as claimed in claim 9, wherein the mirror surface (109) is arranged adjacent to a prism diaphragm (117).

11. Stereolithography device (100) as claimed in claim 1,
    wherein the sensor (103) is designed specifically to detect the light spectrum used in the stereolithography device.

12. Stereolithography device (100) as claimed in claim 11, wherein the sensor (103) is formed by a photodiode.

13. Stereolithography device (100) as claimed in claim 1,
    wherein the control unit (105) comprises a controller (119) for controlling the current through the light source (101).

14. Stereolithography device (100), comprising:
    a light source (101) for emitting light to cure a light-curing material (121);
    a sensor (103) for determining an actual value of the light intensity of the emitted light; and
    a control unit (105) for adapting the electric current through the light source (101) until the actual value of the light intensity reaches a specified desired value;
    wherein the stereolithography device (100) comprises a mirror surface (109) for deflecting the light onto the sensor (103); and
    wherein the mirror surface (109) is arranged adjacent to a prism diaphragm (117).

* * * * *